United States Patent
Zhou et al.

(10) Patent No.: US 12,198,381 B2
(45) Date of Patent: Jan. 14, 2025

(54) HAND POSE ESTIMATION METHOD, DEVICE AND STORAGE MEDIUM

(71) Applicant: GUANGDONG OPPO MOBILE TELECOMMUNICATIONS CORP., LTD., Guangdong (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 383 days.

(21) Appl. No.: 17/748,703

(22) Filed: May 19, 2022

(65) Prior Publication Data
US 2022/0277581 A1    Sep. 1, 2022

Related U.S. Application Data

(63) Continuation of application No. PCT/CN2020/128205, filed on Nov. 11, 2020.
(Continued)

(51) Int. Cl.
*G06T 7/77*    (2017.01)
*G06T 7/50*    (2017.01)
(Continued)

(52) U.S. Cl.
CPC .......... *G06T 7/77* (2017.01); *G06T 7/50* (2017.01); *G06T 7/75* (2017.01); *G06V 10/26* (2022.01);
(Continued)

(58) Field of Classification Search
CPC .... G06T 7/77; G06T 7/50; G06T 7/75; G06T 2207/10028; G06T 2210/12;
(Continued)

(56) References Cited

U.S. PATENT DOCUMENTS

| 6,147,678 A | 11/2000 | Kumar et al. |
| 2011/0129124 A1* | 6/2011 | Givon ...................... G06T 7/75 345/158 |

(Continued)

FOREIGN PATENT DOCUMENTS

| CN | 107066935 A | 8/2017 |
| CN | 108960178 A | 12/2018 |

(Continued)

OTHER PUBLICATIONS

Extended European Search Report for EP Application 20891084.4 mailed Dec. 6, 2022. (8 pages).

(Continued)

*Primary Examiner* — Nimesh Patel

(74) *Attorney, Agent, or Firm* — Young Basile Hanlon & MacFarlane, P.C.

(57) ABSTRACT

Provided are a hand pose estimation method, a device and a computer storage medium. The method may include: determining a classification logic map corresponding to each of a plurality of key-points, the plurality of key-points may represent key nodes of a skeleton of a target hand skeleton, a first key-point may be any one of the plurality of key-points; determining, based on a preset classification map and the classification logic map corresponding to the first key-point, co-ordinate information of the first key-point; and obtaining a pose estimation result of the target hand, in response to determining the co-ordinate information corresponding to each of the plurality of key-points.

16 Claims, 8 Drawing Sheets

Related U.S. Application Data

(60) Provisional application No. 62/938,193, filed on Nov. 20, 2019.

(51) Int. Cl.

| | | |
|---|---|---|
| *G06T 7/73* | (2017.01) | |
| *G06V 10/26* | (2022.01) | |
| *G06V 10/44* | (2022.01) | |
| *G06V 10/764* | (2022.01) | |
| *G06V 10/77* | (2022.01) | |
| *G06V 10/80* | (2022.01) | |
| *G06V 10/82* | (2022.01) | |
| *G06V 20/64* | (2022.01) | |
| *G06V 40/10* | (2022.01) | |

(52) U.S. Cl.
CPC .......... *G06V 10/454* (2022.01); *G06V 10/764* (2022.01); *G06V 10/7715* (2022.01); *G06V 10/809* (2022.01); *G06V 10/82* (2022.01); *G06V 20/64* (2022.01); *G06V 40/11* (2022.01); *G06T 2207/10028* (2013.01); *G06T 2210/12* (2013.01)

(58) Field of Classification Search
CPC . G06T 2207/20084; G06T 2207/20021; G06T 2207/20076; G06T 2207/20081; G06T 2207/30201; G06T 7/11; G06T 2207/30196; G06T 7/73; G06T 7/74; G06T 2200/04; G06T 2200/08; G06T 2207/10024; G06T 11/00; G06T 17/00; G06T 2207/30244; G06T 3/40; G06T 2207/10016; G06T 9/002; G06T 7/97; G06T 19/003; G06T 2200/24; G06T 2207/10004; G06T 2207/20104; G06T 7/251; G06T 7/143; G06T 7/60; G06T 7/62; G06T 7/70; G06T 15/205; G06V 10/26; G06V 10/454; G06V 10/764; G06V 10/7715; G06V 10/809; G06V 10/82; G06V 20/64; G06V 40/11; G06V 40/28; G06V 40/107; G06V 40/113; G06V 40/103; G06V 10/40; G06V 20/653; G06V 40/23; G06V 10/25; G06V 20/41; G06V 20/647; G06V 40/117; G06V 40/20; G06V 10/771; G06V 20/58; G06V 2201/033; G06V 40/165; G06V 10/225; G06V 10/255; G06V 10/46; G06V 10/776; G06V 20/40; G06V 20/44; G06V 20/52; G06V 20/46; G06N 3/045; G06N 3/08; G06N 20/00; G06N 3/084; G06N 3/04; G06N 3/0464; G06N 3/047; G06N 5/022; G06N 5/046; G06N 3/048; G06N 3/088; G06N 20/10; G06N 3/126; G06N 5/048; G06N 7/00; G06N 3/02; G06N 3/044; G06N 3/096; G06F 18/24; G06F 3/012; G06F 3/013; G06F 18/2431; G06F 2203/04101
See application file for complete search history.

(56) References Cited

U.S. PATENT DOCUMENTS

| | | | |
|---|---|---|---|
| 2019/0171871 A1 | 6/2019 | Zhang et al. | |
| 2019/0180473 A1* | 6/2019 | Guleryuz | G06V 40/10 |
| 2019/0278983 A1* | 9/2019 | Iqbal | G06N 3/084 |
| 2019/0347826 A1* | 11/2019 | Zhang | G06N 3/08 |
| 2021/0117661 A1* | 4/2021 | Iqbal | G06N 3/084 |
| 2021/0279456 A1* | 9/2021 | Luo | G06T 7/75 |
| 2022/0036052 A1* | 2/2022 | Prince | G06T 7/246 |

FOREIGN PATENT DOCUMENTS

| | | |
|---|---|---|
| CN | 109190461 A | 1/2019 |
| CN | 109359538 A | 2/2019 |
| CN | 105389539 B | 6/2019 |
| CN | 110175566 A | 8/2019 |
| CN | 110472554 A | 11/2019 |

OTHER PUBLICATIONS

Kazakos et al., On the fusion of RGB and Depth information for Hand pose estimation, IEEE, 2018. (868-872 pages).

Fang et al., Feature covariance matrix-based dynamic hand gesture recognition, Neural Computing and Applications, Sep. 15, 2018. (14 pages).

Doosti Bardia, Hand Pose Estimation:A Survey, School of Informatics, Computing and Engineering Indiana University Bloomington, Jun. 2, 2019. (21 pages).

International Search Report with English Translation for PCT Application PCT/CN2020/128205 mailed Feb. 18, 2021. (17 pages).

Kazakos et al, "On the Fusion of RGB and Depth Information for Hand Pose Estimation"; 2018 25th IEEE International Conference on Image Processing (ICIP); Sep. 6, 2018; 6 pages.

Wenmeng et al., "Markerless hand pose estimation system using Kinect"; Journal of Nanjing University (Natural Sciences), vol. 51, Issue 2; Mar. 30, 2015; 20 pages.

Chinese First Office Action and English translation for Chinese Patent Application No. 202080072087.7, mailed Jul. 22, 2024, 14 pages.

* cited by examiner

HAND POSE ESTIMATION METHOD, DEVICE AND STORAGE MEDIUM

CROSS-REFERENCE TO RELATED APPLICATION(S)

This application is a continuation application of International (PCT) Patent Application No. PCT/CN2020/128205 filed on Nov. 11, 2020, which claims the priority and benefit of U.S. Provisional Patent Application No. 62/938,193, filed Nov. 20, 2019, the entire contents of both of which are incorporated herein by reference.

TECHNICAL FIELD

Embodiments of the present disclosure relate to the field of image recognition technology, and in particular to a hand pose estimation method, a device and a storage medium.

BACKGROUND

The ability to accurately and efficiently reconstruct the motion of a human hand from images promises exciting new applications in immersive virtual and augmented realities, robotic control, and sign language recognition. There has been great progress in recent years in the reconstruction of the motion of the human hand, especially with the arrival of consumer depth cameras. However, it remains a challenging task due to unconstrained global and local pose variations, frequent occlusion, local self-similarity, and a high degree of articulation.

The previous technical schemes for hand pose estimation either use a fully-connected layer to regress the hand key-point co-ordinates, or use classification based approach to predict the spatial locations of the key-points. The regression based approach computes the hand pose in a global way, i.e., predicts each key-point using all the information of the key-point features. In contrast, the classification based approach is applied in a more local fashion, i.e., to gradually grab features of neighboring key-points and predict the key points.

However, the human hand has a relatively small area and a high degree of freedom, the relationship between the joints of the human hand is complex. A self-occlusion may also easily occur. The fingers themselves have a relatively high self-similarity. In view of these problems, it is difficult to obtain high-accuracy hand pose estimation results with any of the previous technical schemes.

SUMMARY

A hand pose estimation method, an apparatus, a device and a computer storage medium are provided in the present disclosure, which may increase the accuracy of the hand pose estimation, and obtain a hand pose estimation result of high precision.

The technical solution of the present disclosure may be achieved as follows.

According a first aspect, a hand pose estimation method may be provided in some embodiments of the present disclosure. The method may include: determining a classification logic map corresponding to each of a plurality of key-points, the plurality of key-points may represent key nodes of a skeleton of a target hand, a first key-point may be any one of the plurality of key-points; determining, based on a preset classification map and the classification logic map corresponding to the first key-point, co-ordinate information of the first key-point; obtaining the pose estimation result of the target hand, in response to determining the corresponding co-ordinate information of each of the plurality of key-points.

According to a second aspect, an electronic device may be provided in some embodiments of the present disclosure. The electronic device may include a memory and a processor. The memory may be configured for storing executable instructions capable of running on the processor. The processor may be configured for executing the method as described in the first aspect when running the executable instructions.

According to a third aspect, a non-transitory computer-readable storage medium may be provided in some embodiments of the present disclosure. The computer storage medium may store a hand pose estimation program. The hand pose estimation program when being executed by the processor may implement the method as described in the first aspect.

Embodiments of the present disclosure provides a hand pose estimation method, a device and a non-transitory computer-readable storage medium. A classification logic map corresponding to each of the plurality of key-points may be determined. The plurality of key-points may represent key nodes of a skeleton of a target hand. The first key-point may be any one of the plurality of key-points. The co-ordinate information of the first key-point may be determined based on a preset classification map and the classification logic map corresponding to the first key-point. The pose estimation result of the target hand may be obtained, after the corresponding co-ordinate information of each of the plurality of key-points is determined. In this way, for each key-point, a classification may be first performed with the classification logic map, then the co-ordinate information of the key-point may be determined by a regression model. After the corresponding co-ordinate information of each of the plurality of key-points is determined, the pose estimation result of the target hand may be obtained. Thus, by considering both the classification approach and the regression approach, the accuracy of the hand pose estimation may be enhanced, and a hand pose estimation result with a high accuracy may be obtained.

DETAILED DESCRIPTION

In order to describe the features and technical aspects of embodiments of the present disclosure more thoroughly, the following is a detailed description of the embodiments of the present disclosure in conjunction with the accompanying drawings, which are for illustrative purposes only and not intended to limit the embodiments of the present disclosure.

Hand pose estimation mainly refers to the accurate estimation of the three-dimensional (3D) co-ordinate locations of the human hand skeleton nodes from images. This is a key problem in the field of computer vision and human-computer interaction, and is of great importance in the fields of virtual reality, augmented reality, non-contact interaction and gesture recognition. With the rise and development of commercially available and inexpensive depth cameras, the hand pose estimation has found great progress.

Among them, depth cameras may include several types such as structured light type, laser scanning type and TOF. In most cases, depth cameras may refer to TOF cameras. Here, TOF is the abbreviation of Time of Fight, which plainly means flying time. The so-called 3D imaging of Time of Flight method is configured to obtain a target distance of an object by sending a continuous light pulse to a target, then using a sensor to receive the light returned from the object and detecting the time of flight (round trip) of the light pulse. Specifically, a TOF camera is a range imaging camera system, that employs time-of-flight techniques to resolve the distance between the TOF camera and the subject being shot for each point of the image, by measuring the round trip time of an artificial light signal provided by a laser or an Light Emitting Diode (LED).

Figure 1:
FIG. 1 is a schematic image captured by a kind of TOF camera provided according to some related technical schemes.

The TOF camera may output an image of size H×W, each pixel value on the Two-dimensional (2D) image represents a depth value of the pixel. The pixel value may range from 0-3000 millimeter (mm). An example image captured by a kind of TOF camera according to some technical schemes is shown in FIG. 1. In the embodiments of the present application, an image captured by the TOF camera may be referred as a depth image.

As an example, compared with TOF cameras from other commodities, the TOF cameras delivered by OPPO inc. has the following distinguishing features: (1) the TOF camera of OPPO inc. can be installed inside a mobile phone instead of being fixed on a static stand; 2) they have lower power consumption than TOF cameras from other commodities (such as Microsoft Kinect® or Intel Realsense®); 3) they have lower image resolution, e.g. 240×180, compared to typical 640×480.

Figure 2:
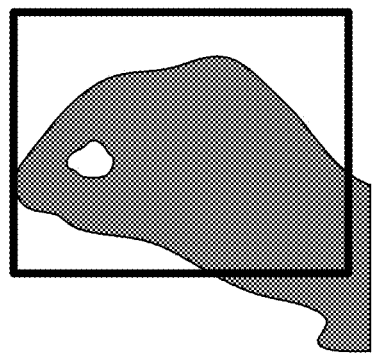
FIG. 2 is a schematic detection result of a hand bounding box provided according to some related technical schemes.

It should be understood that, for a hand detection process, the input may be a depth image, the output may be a probability of hand presence (i.e., a numerical number from 0 to 1, the larger the number value is, the larger the confidence of the hand presence) and a hand bounding box (i.e., a bounding box representing a location and a size of the hand). FIG. 2 shows a schematic diagram of a hand bounding box detection result according to some technical schemes. As shown in FIG. 2, a black rectangular box is a hand bounding box. The confidence score of the hand bounding box is up to 0.999884.

In some embodiments of the present disclosure, the bounding box may also be referred as a boundary box. Here, the bounding box may be represented as (xmin, ymin, xmax, ymax). Wherein (xmin, ymin) is a left-top corner location of the bounding box, and (xmax, ymax) is a right-down corner location of the bounding box.

Figure 3:
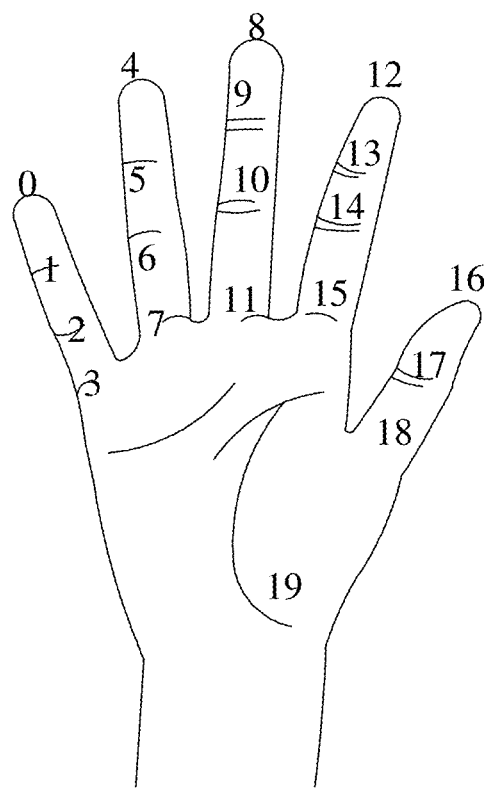
FIG. 3 is a schematic diagram of key-point locations of a hand skeleton provided according to some related technical schemes.
Figure 4:
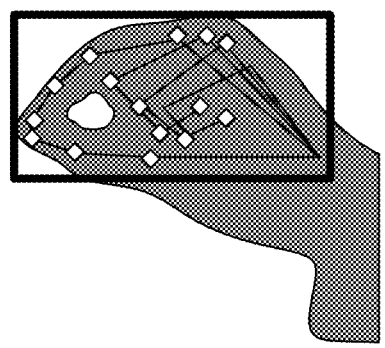
FIG. 4 is a schematic diagram of a two-dimensional hand pose estimation result provided according to some related technical schemes.

Specifically, in a process of a 2D hand pose estimation, the input may be the depth image, and the output may be the 2D key-point locations of a hand skeleton. An example image of the key-point locations of the hand skeleton is shown in FIG. 3. In FIG. 3, 20 key-points may be arranged on the hand skeleton. The location of each key-point may be referred to as one of the labels 0-19 in FIG. 3. In this context, the lactation of each key-point may be represented by a 2D co-ordinate (x, y). x may be a co-ordinate along a horizontal axis of the image, y may be a co-ordinate along a vertical axis of the image. As an example, after the co-ordinates of the 20 key-points are determined, a 2D hand pose estimation result may be as shown in FIG. 4.

In a process of a 3D hand pose estimation, the input may also be the depth image, while the output may be the 3D key-point locations of the hand skeleton. An example image of the key-point locations of the hand skeleton is also shown in FIG. 3. In this context, the lactation of each key-point may be represented by a 3D co-ordinate (x, y, z). x may be a co-ordinate along the horizontal axis of the image, y may be a co-ordinate along the vertical axis of the image, z may be a co-ordinate along a depth direction. Embodiments of the present disclosure may be dedicated to solve the problem of the 3D hand pose estimation.

Figure 5:
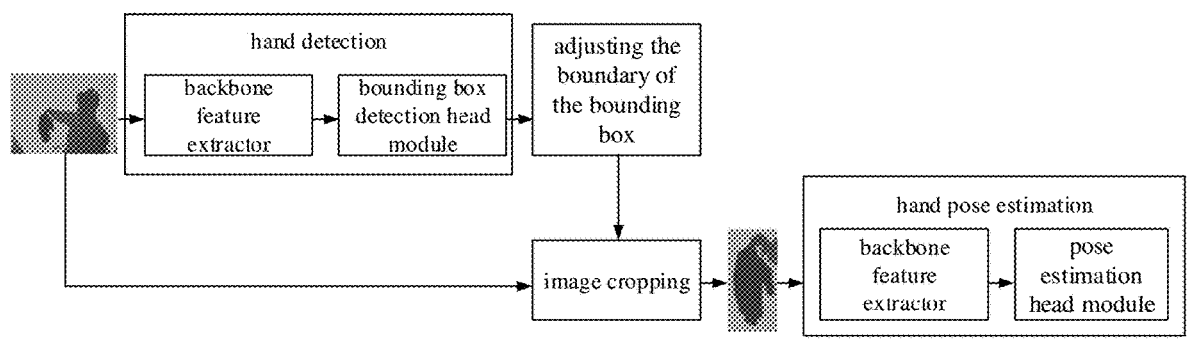
FIG. 5 is a pipeline of a conventional hand pose detection provided according to some related technical schemes.

Nowadays, a typical hand pose detection pipeline may include a hand detection part and a hand pose estimation part. The hand detection part may include a backbone feature extractor and a bounding box detection head module. The hand pose estimation part may include a backbone feature extractor and a pose estimation head module. As an example, the pipeline of a conventional hand pose detection process provided by some related technical schemes may be shown in FIG. 5. As shown in FIG. 5, after an raw depth image including a hand is obtained, a hand detection can firstly be performed. Specifically, the hand detection process may be performed using the backbone feature extractor and the bounding box detection head module included in the hand detection part. At this time, it is also possible to perform the hand pose estimation by: adjusting the boundary of the bounding box; then cropping the image using the adjusted bounding box and performing hand pose estimation on the cropped image. Specifically, the pose estimation process may be performed using the backbone feature extractor and the pose estimation head module included in the hand pose estimation part. It should be noted that, the tasks of the hand detection and the hand pose estimation are completely separated. To connect the two tasks, the location of the output bounding box may be adjusted to the mass center of the pixels inside the bounding box, and the size of the bounding box may be enlarged a little to include all the hand pixels. The adjusted bounding box may be used to crop the raw depth image. The cropped image may be fed into the task of hand pose estimation. Duplicated computation may be found when the backbone feature extractor is applied twice to extract the image features, and the computation burden may be correspondingly increased.

Figure 6:
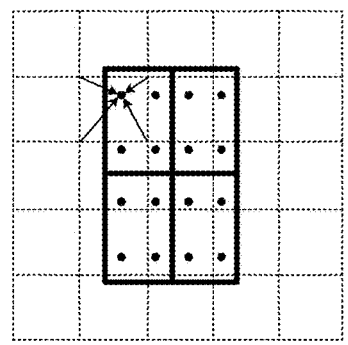
FIG. 6 is a schematic architectural diagram of a kind of RoIAlign feature extractor provided according to some related technical schemes.

Now, the RoIAlign may be introduced. ROIAlign is an approach for region feature aggregation, and can well solve the problem of region mismatch caused by two quantization processes in an ROI Pool operation. During a detection task, replacing the ROI Pool with ROIAlign can improve the accuracy of detection results. In other words, RoIAlign layer may remove the harsh quantization of RoIPool, properly align the extracted features with the input. In this context, any quantization of the RoI boundaries or bins may be avoided. For example, here x/16 instead of [x/16] may be used. Further, a bilinear interpolation may be used to compute the exact values of the input features at four regularly sampled locations in each RoI bin, and the results may be aggregated (using the maximum value or the average value), refer to FIG. 6 for more details. In FIG. 6, the dashed grid may represent a feature map, the bold and solid line may represent an RoI (e.g. 2×2 bins), and 4 sampling points are dotted in each bin. The RoIAlign may compute, by bilinear interpolation, the value of each sampling point from the nearby grid-points on the feature map. No quantization is performed on any co-ordinates involved in the RoI, its bins, or the sampling points. It should be noted that, the results are not sensitive to the accuracy of the sampling locations or the number of sampled points, as long as no quantization is performed.

Non-maximum suppression (NMS) has been widely used in several key aspects of computer vision, and is an integral part of many detection approach, might it be edge, corner or object detection approach. The necessity of NMS stems from the imperfect ability of detection algorithms to localize the concept of interest, resulting in several detection groups occurring near a real location.

Figure 7:
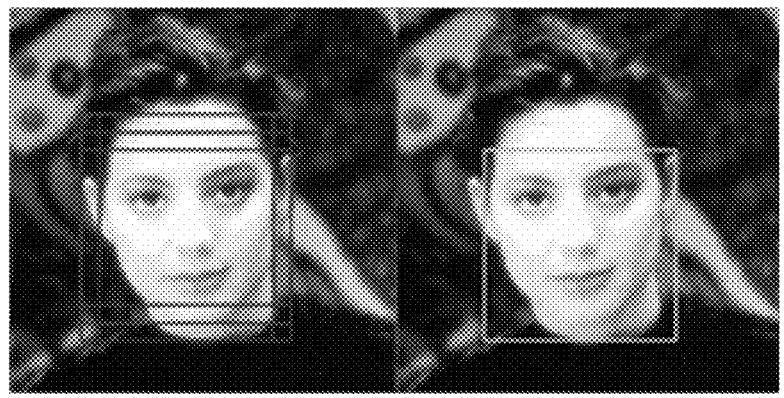
FIG. 7 is a schematic architectural diagram of a kind of non-maximum suppression provided according to some related technical schemes.

In the context of object detection, approaches based on sliding windows typically produce a plurality of windows with high scores and the plurality of windows are close to the correct location of the object. This is a consequence of the generalization ability of object detectors, the smoothness of the response function and visual correlation of close-by windows. This relatively dense output may generally not be satisfying for understanding the content of an image. As a matter of fact, the number of window-hypotheses at this step is simply uncorrelated with the real number of objects in the image. The goal of NMS is therefore to retain only one window per group, corresponding to the precise local maximum of the response function. Ideally, only one detection is obtained for one object. One specific example of NMS is shown in FIG. 7. The purpose of NMS is simply to retain a window (as shown in FIG. 7 as the bold-gray rectangular box).

Figure 8:
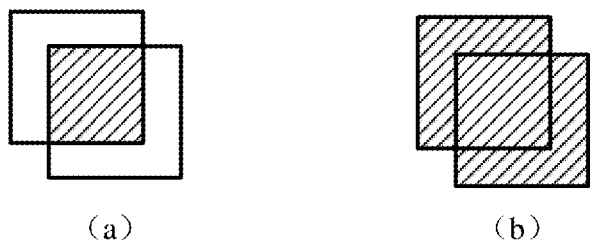
FIG. 8 is a schematic structural diagram of a kind of union and intersection provided according to some related technical schemes.

As shown in FIG. 8, a schematic diagram of a union and intersection provided by some related technical schemes may be illustrated. Two bounding boxes denoted as BB1 and BB2 respectively are given in FIG. 8. Here, a black region in (a) is the intersection of BB1 and BB2, denoted as BB1∩BB2, and is an overlapped region of BB1 and BB2. The black region in (b) is the union of BB1 and BB2, denoted as BB1∪BB2, and is a union region of BB1 and BB2. Specifically, the computational formula of the Intersection over Union (denoted as IoU) is shown as below.

$$IoU = \frac{\text{Area of Overlap}}{\text{Area of Union}} = \frac{BB1 \cap BB2}{BB1 \cup BB2} \quad (1)$$

In addition, each pixel co-ordinate in the image can be denoted in an XYZ co-ordinate system or in a UVD co-ordinate system. Here, (x, y, z) is the pixel co-ordinate in the XYZ co-ordinate system, (u, v, d) is the pixel co-ordinate in the UVD co-ordinate system. Assuming that $C_x$ and $C_y$ represent the co-ordinates of a principal point, which would be ideally in the center of the image, $f_x$ and $f_y$ are the focal lengths along the x direction and the y direction respectively, then a convention relationship between the UVD co-ordinate system and the XYZ co-ordinate system is as shown in the following equation.

$$\begin{cases} x = \frac{(u - C_x) \times d}{f_x} \\ y = \frac{(v - C_y) \times d}{f_y} \\ z = d \end{cases} \quad (2)$$

It is also important to note that, classification-predictive modeling problems are different from regression-predictive modeling problems. Classification is a task of predicting a discrete class label, while regression is the task of predicting a continuous quantity. There is some overlap between the algorithms for classification and regression. For example, a classification algorithm may predict a continuous value, but the continuous value is in the form of a probability for a class label. A regression algorithm may predict a discrete value, but the discrete value is in the form of an integer quantity.

The previous technical schemes for hand pose estimation either use a fully-connected layer to regress the hand key-point co-ordinates, or use classification based approach to predict the spatial locations of the key-points. The regression based approach computes the hand pose in a global way. i.e., the regression based approach predicts each key-point using all the information of the key-point features. In contrast, the classification based approach is applied in a more local fashion. i.e., the classification based approach gradually grabs the features of neighboring key-points. In view of the global shape and geometry and the local shape and geometry, the two approaches are complementary. In order to make fuller use of the advantages of these two approaches, a hand pose estimation method based on cascaded classification and regression to improve the accuracy of the hand pose estimation may be proposed according to some embodiments of the present disclosure.

Accordingly, a hand pose estimation method according to some embodiments of the present disclosure may be provided. A basic idea of the method may be: determining a classification logic map corresponding to each of a plurality of key-points; the plurality of key-points may represent key nodes of a skeleton of a target hand, a first key-point may be any one of the plurality of key-points; determining, based on a preset classification map and the classification logic map corresponding to the first key-point, the co-ordinate information of the first key-point; obtaining the pose estimation result of the target hand, after determining the corresponding co-ordinate information of each of the plurality of key-points. In this way, for each key-point, a classification may be first performed with the classification logic map, then the co-ordinate information of the key-point may be determined with a regression model, and after the corresponding co-ordinate information of each of the plurality of key-points is determined, the pose estimation result of the target hand may be obtained. Thus, by considering both the classification approach and the regression approach, the accuracy of the hand pose estimation may be enhanced, and a hand pose estimation result with a high accuracy may be obtained.

Each embodiment of the present disclosure will be described in detail below in conjunction with the accompanying drawings.

In some embodiments, a hand pose estimation method may include: determining a classification logic map corresponding to each of a plurality of key-points, the plurality of key-points represent key nodes of a skeleton of a target hand, a first key-point is any one of the plurality of key-points; determining, based on a preset classification map and the classification logic map corresponding to the first key-point, co-ordinate information of the first key-point; and obtaining a pose estimation result of the target hand, after determining co-ordinate information corresponding to each of the plurality of key-points.

In some embodiments, the step of determining the classification logic map corresponding to each of the plurality of key-points may include: acquiring a feature map corresponding to the target hand; and performing a classification process on the plurality of key-points in the feature map, and obtaining a classification logic map corresponding to each of the plurality of key-points.

In some embodiments, the step of acquiring the feature map corresponding to the target hand may include: acquiring a depth image may include the target hand; performing a hand detection process on the depth image by a preset feature extractor, and obtaining an initial feature map may include the target hand; and convolving the initial feature map by a head segmentation model, and obtaining the feature map corresponding to the target hand.

In some embodiments, the step of determining, based on the preset classification map and the classification logic map corresponding to the first key-point, the co-ordinate information of the first key-point may include: determining, based on the classification logic map corresponding to the first key-point, triplet information for each network grid in the preset classification map; and determining, based on the triplet information of each network grid in the preset classification map, the co-ordinate information of the first key-point.

In some embodiments, the triplet information may include a grid probability, a horizontal co-ordinate and a vertical co-ordinate of a grid center pixel.

In some embodiments, the step of determining, based on the classification logic map corresponding to the first key-point, the triplet information for each grid in the preset classification map may include: computing, based on the classification logic map corresponding to the first key-point, a grid probability corresponding to each grid by a first computation model; acquiring the horizontal co-ordinate and the vertical co-ordinate of the grid center pixel corresponding to each grid; and composing, based on the grid probability, the horizontal co-ordinate and the vertical co-ordinate of the grid center pixel corresponding to each networkgrid, the triplet information of each grid in the preset classification map.

In some embodiments, the step of determining, based on the triplet information of each grid in the preset classification map, the co-ordinate information of the first key-point may include: performing a regression computation based on the grid probability, the horizontal co-ordinate and the vertical co-ordinate of the grid center pixel corresponding to each grid in the preset classification map, to obtain the co-ordinate information of the first key-point.

In some embodiments, the step of performing the regression computation based on the grid probability, the horizontal co-ordinate and the vertical co-ordinate of the grid center pixel corresponding to each grid in the preset classification map, to obtain the co-ordinate information of the first key-point may include: obtaining the horizontal co-ordinate information of the first key-point by a second computation model, based on the grid probability and the horizontal co-ordinate of the grid center pixel corresponding to each grid in the preset classification map; obtaining the vertical co-ordinate information of the first key-point by a third computation model, based on the grid probability and the vertical co-ordinate of the grid center pixel corresponding to each grid in the preset classification map; and obtaining the co-ordinate information of the first key-point, based on the horizontal co-ordinate information of the first key-point and the vertical co-ordinate information of the first key-point.

In some embodiments, the step of obtaining the horizontal co-ordinate information of the first key-point by the second computation model, based on the grid probability and the horizontal co-ordinate of the grid center pixel corresponding to each grid in the preset classification map may include: computing a weighted sum of the grid probability and the horizontal co-ordinate of the grid center pixel corresponding to each grid in the preset classification map by the second computation model, and determining a computed weighted sum value as the horizontal co-ordinate information of the first key-point.

In some embodiments, the step of obtaining the vertical co-ordinate information of the first key-point by the third computation model, based on the grid probability and the vertical co-ordinate of the grid center pixel corresponding to each grid in the preset classification map may include: computing a weighted sum of the grid probability and the vertical co-ordinate of the grid center pixel corresponding to each grid in the preset classification map by the third computation model, and determining a computed weighted sum value as the vertical co-ordinate information of the first key-point.

In some embodiments, after the step of determining the co-ordinate information of the first key-point, the method further may include: scaling the co-ordinate information of the first key-point, and determining the scaled co-ordinate information as the co-ordinate information of the first key-point.

In some embodiments, the co-ordinate information of the first key-point may include the horizontal co-ordinate of the first key-point and the vertical co-ordinate of the first key-point; the step of scaling the co-ordinate information of the first key-point, and determining the scaled co-ordinate information as the co-ordinate information of the first key-point may include: scaling the horizontal co-ordinate information of the first key-point by a first preset value, to obtain a scaled horizontal co-ordinate information of the first key-point; scaling the vertical co-ordinate information of the first key-point by a second preset value, to obtain a scaled vertical co-ordinate information of the first key-point; and obtaining the co-ordinate information of the first key-point, based on the scaled horizontal co-ordinate information of the first key-point and the scaled vertical co-ordinate information of the first key-point.

In some embodiments, the method may further include: acquiring a size parameter of a bounding box containing the target hand and a dimensional parameter of the preset classification map; computing a first ratio of the size parameter of the bounding box and the dimensional parameter of the preset classification map along the horizontal direction, and assigning the first ratio as the first preset value; computing a second ratio of the size parameter of the bounding box and the dimensional parameter of the preset classification map along the vertical direction, and assigning the second ratio as the second preset value.

In some embodiments, a hand pose estimation apparatus may include a determining unit, a computation unit and an estimation unit. The determining unit may be configured for determining a classification logic map corresponding to each of a plurality of key-points, the plurality of key-points represent key nodes of a skeleton of a target hand, a first key-point is any one of the plurality of key-points. The computation unit may be configured for determining, based on a preset classification map and the classification logic map corresponding to the first key-point, co-ordinate information of the first key-point. The estimation unit may be configured for obtaining a pose estimation result of the target hand, after determining co-ordinate information corresponding to each of the plurality of key-points.

In some embodiments, an electronic device may include a memory and a processor. The memory may be configured for storing executable instructions capable of running on the processor. The processor may be configured for executing the method hand pose estimation method mentioned-above when running the executable instructions.

In some embodiments, a computer storage medium may store a hand pose estimation program. The hand pose estimation program when being executed by a processor may realize a hand pose estimation method.

Figure 9:
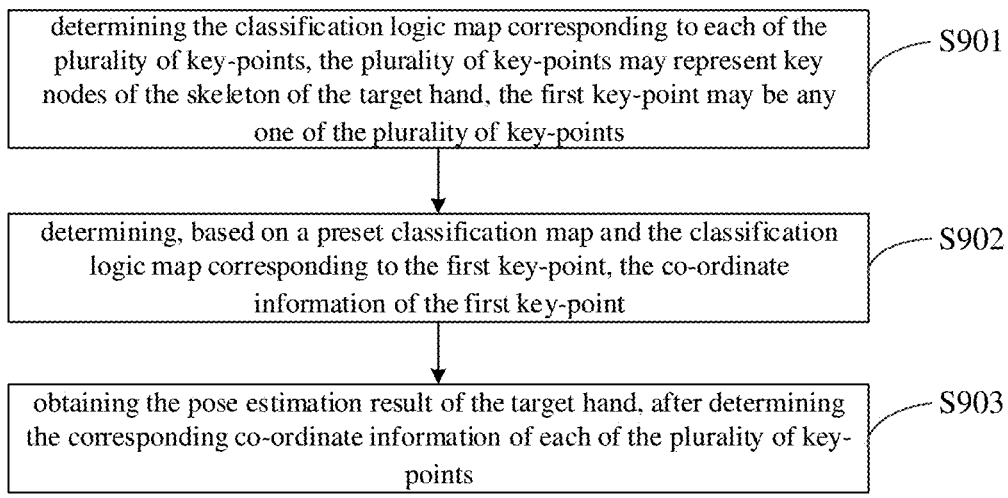
FIG. 9 is a flow chart of a hand pose estimation method according to an embodiment of the present disclosure.

Referring to FIG. 9, a schematic flowchart of the hand pose estimation method according to an embodiment of the present disclosure is illustrated. The method may include the following operations at blocks shown in FIG. 9.

At block S901: determining the classification logic map corresponding to each of the plurality of key-points. The plurality of key-points may represent key nodes of the skeleton of the target hand. The first key-point may be any one of the plurality of key-points.

It should be noted that, the method of the embodiment of the present disclosure may be applied to a hand pose estimation apparatus, or an electronic device integrated with such an apparatus. The electronic device may be a smartphone, a tablet, a laptop, a pocket computer, a Personal Digital Assistant (PDA), a navigation apparatus, a wearable device, a desktop computer, etc., without any limitation the embodiments of the present disclosure.

It should also be noted that, for the human hand, the number of hand skeleton key-nodes, i.e., the number of the key-points, may be more than one. Commonly, the hand may include 20 key-points, and the specific locations of these 20 key-points in the hand are shown in FIG. 3.

It should be appreciated that, the classification logic map may be obtained by convolving a feature map, while the feature map may be obtained on the basis of a previous segmentation head. Thus, in some embodiments, the step of determining the classification logic map corresponding to each of the plurality of key-points may include: acquiring a feature map corresponding to the target hand; and performing a classification process on the plurality of key-points in the feature map, to obtain a classification logic map corresponding to each of the plurality of key-points.

Further, in some embodiments, the step of acquiring the feature map corresponding to the target hand may include: acquiring a depth image including the target hand; performing a hand detection process on the depth image using a preset feature extractor, to obtain an initial feature map including the target hand; and convolving the initial feature map using the head segmentation model, to obtain the feature map corresponding to the target hand.

It should be noted that, the preset feature extractor may be a backbone feature extractor and an RoIAlign feature extractor. After the depth image including the target hand is acquired, the detection process may be performed firstly using the backbone feature extractor and a bounding box detection head module. After a suitable bounding box is selected, a feature mapping may be performed using the RoIAlign feature extractor, to obtain the initial feature map including the target hand.

Figure 10A:
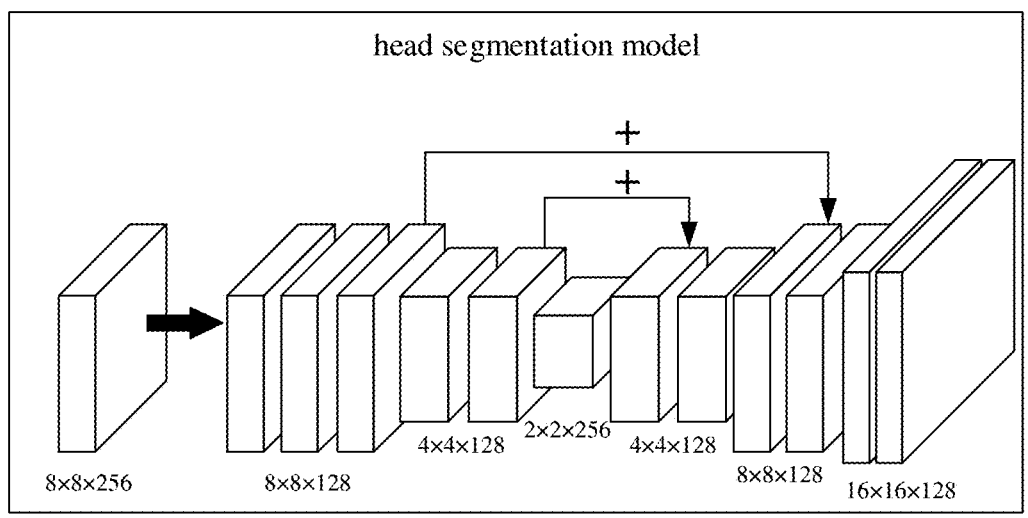
FIG. 10A is a schematic diagram of an Hour-Glass network feature architecture of a head segmentation model according to an embodiment of the present disclosure.
Figure 10B:
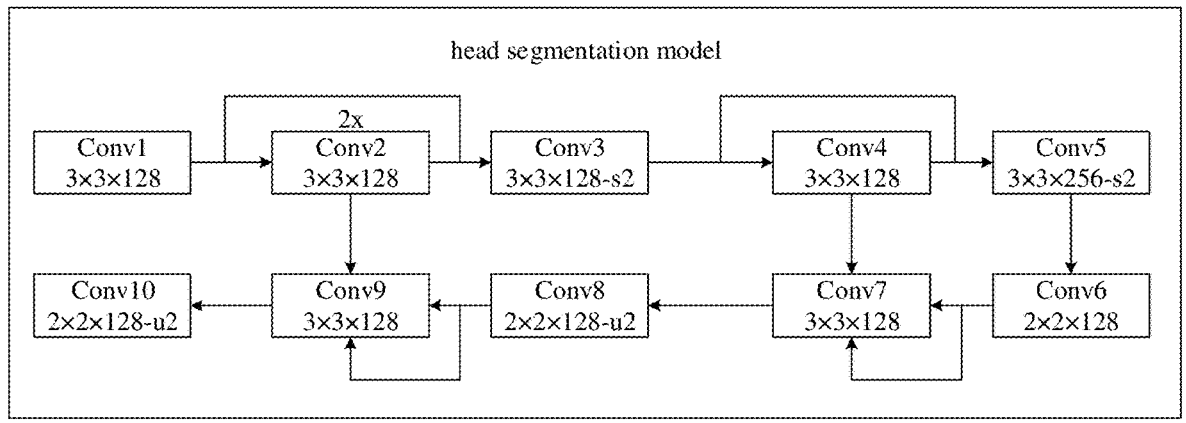
FIG. 10B is a schematic diagram of a convolutional neural network architecture of a head segmentation model according to an embodiment of the present disclosure.

For the initial feature map, a convolutional process may be performed using a head segmentation model, to obtain the corresponding feature map of the target hand. The head segmentation model may include up-sampling blocks and down-sampling blocks. The Hour-Glass (HG) network feature map of this head segmentation model is shown in FIG. 10A, and its convolutional neural network architecture is shown in FIG. 10B. Here, assuming that the initial feature map passing the RoIAlign feature extractor is 8×8×256, then the feature map obtained after the convolutional process of the head segmentation model is 16×16×128.

It should be noted that, after the feature map corresponding to the target hand is obtained, performing a classification process on the plurality of key-points in the feature map, to obtain the classification logic map corresponding to each of the plurality of key-points. Specifically, in some embodiments, the step of performing the classification process on the plurality of key-points in the feature map, to obtain the classification logic map corresponding to each of the plurality of key-points may include: feeding the feature map into the preset classification neural network model, and outputting the classification logic map corresponding to each of the plurality of key-points through the preset classification neural network model.

That is, the acquired feature map may be fed into the preset classification neural network model, and the classification logic map corresponding to each of the 20 key-points may be obtained. The preset classification neural network model may be obtained by model-training the classification neural network model using a training sample set.

Figure 11:
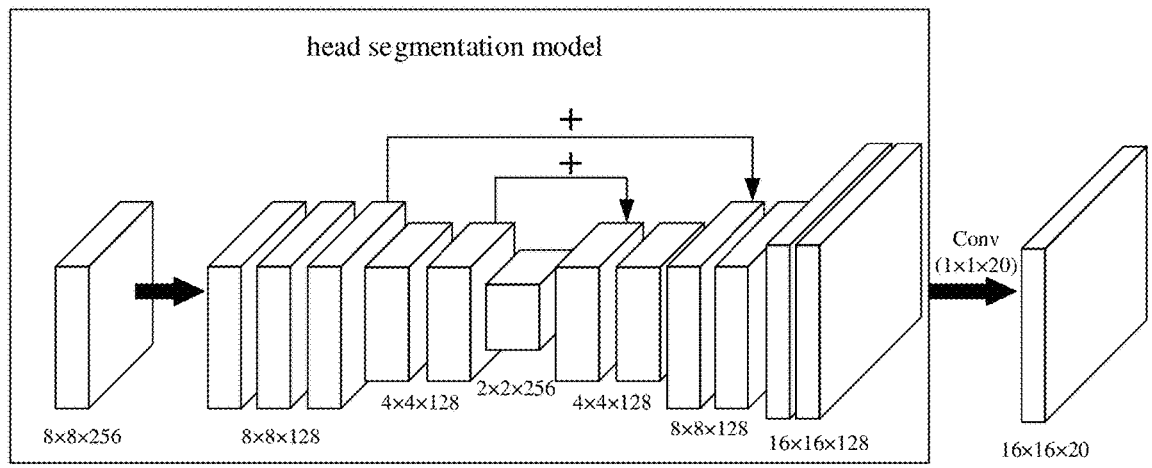
FIG. 11 is a schematic diagram of a network architecture according to an embodiment of the present disclosure.

As an example, as shown in FIG. 11, if in some embodiments of the present disclosure, the feature map obtained by the head segmentation model is of 16×16×128, then the 16×16×128 feature map may be convolved with a 1×1×20 convolution, and at this time, a 16×16×20 classification logic map may be output. The classification logic map $Y=\{y_i\}, i\in\{0, 1 \ldots, 15\}\times\{0, 1, \ldots, 15\}$. Here, among the 20 key-points, each key-point may correspond to a 16×16 classification logic map.

In this way, after the classification logic map corresponding to each of the plurality of key-points is obtained, the classification logic map corresponding to one of the plurality of key-points (e.g., the first key-point) may be taken as an example in the following, to compute the coordinate information of the key-points.

At block S902: determining, based on a preset classification map and the classification logic map corresponding to the first key-point, the co-ordinate information of the first key-point.

It should be noted that, the first key-point may be any key-point of the plurality of key-points. The preset classification map may be a classification map pre-defined according to some embodiments of the present disclosure. Specifically, in some embodiments, for S902, the step of determining, based on the preset classification map and the classification logic map corresponding to the first key-point, the co-ordinate information of the first key-point may include: determining, based on the classification logic map corresponding to the first key-point, a triplet information for each grid in the preset classification map; and determining, based on the triplet information of each grid in the preset classification map, the co-ordinate information of the first key-point.

In the embodiments of the present disclosure, the triplet information may include the grid probability (denoted by $p_i$), a horizontal co-ordinate (denoted by $C_{ix}$) and a vertical co-ordinate (denoted by $C_{iy}$) of the grid center pixel. i represents the i-th grid of the preset classification map, $i \in \{0, 1 \ldots, 15\} \times \{0, 1, \ldots, 15\}$.

It should be appreciated that, before the triplet information of each grid in the preset classification map is determined, the classification map may be pre-defined in the embodiments of the present disclosure. Thus, in some embodiments, the method may further include: creating the preset classification map. The number of grids in the preset classification map may be related to the dimensional parameters of the classification logic map.

That is, in the embodiments of the present disclosure, a classification map $S = \{t_i\}$, $i \in \{0, 1 \ldots, 15\} \times \{0, 1, \ldots, 15\}$ may be pre-defined. In the classification map, the co-ordinate information (including the horizontal co-ordinate and the vertical co-ordinate) of the pixel of each grid center of the determined classification logic map and the preset classification map may be included. Here, if the dimensional parameter of the classification logic map is 16×16, then the corresponding grid number of the classification map is 16×16. Generally, as shown in the architecture of the classification map in FIG. 12 for an example, if the classification map has a shape of 112×112 pixels and 16×16 grids, then each grid may account for 7×7 pixels. In some embodiments of the present disclosure, the preset classification map is preset, and corresponds to 16×16 grids. Different 16×16×20 classification logic maps may be output according to different input images, but the 16×16 in the classification logic map and the 16×16 in the preset classification map may correspond to each other.

Further, in some embodiments, the step of determining, based on the classification logic map corresponding to the first key-point, the triplet information for each grid in the preset classification map may include: computing, based on the classification logic map corresponding to the first key-point, a grid probability corresponding to each grid by a first computation model; acquiring the horizontal co-ordinate and the vertical co-ordinate of the grid center pixel corresponding to each grid; and composing, based on the grid probability, the horizontal co-ordinate and the vertical co-ordinate of the grid center pixel corresponding to each grid, the triplet information of each grid in the preset classification map.

That is, each grid $t_i$ may relate to a triplet information ($p_i$, $C_{ix}$, $C_{iy}$). $p_i$ is the grid probability of the i-th grid, $C_{ix}$ is the horizontal co-ordinate of the grid center pixel of the i-th grid, and $C_{iy}$ is the vertical co-ordinate of the grid center pixel of the i-th grid.

Here, the grid probability may be computed using the classification logic map and the first computation model. The first computation model may be a softmax function. The softmax function, also known as a normalized exponential function, is actually a gradient-logarithmic normalization of a finite term discrete probability distribution, and is a generalization of a logistic function. It may "compress" a K-dimensional vector z with any real numbers into another K-dimensional real vector $\delta(z)$, such that each element ranges between (0,1) and the sum of all elements is 1. Specifically, the formula of the first computation model is as follows:

$$p_i = \frac{e^{-y_i}}{\sum_j e^{-y_j}} \quad (3)$$

In the formula (3), the numerator may map a real output to a value between zero and positive infinity by an exponential function, the denominator may perform a normalization by summing all results. In this way, for the classification logic map $\{y_i\}$, the multi-classification output may be converted into grid probability values with the softmax function shown in formula (3).

Further, after the grid probability value ($p_i$) corresponding to each grid is obtained, it is combined with the co-ordinate information ($C_{ix}$, $C_{iy}$) of the grid center pixel corresponding to each grid, to compose the triplet information of each grid of the preset classification map. The co-ordinate information of the first key-point may be obtained based on the triplet information of each grid in the preset classification map. Specifically, in some embodiments, the step of determining, based on the triplet information of each grid in the preset classification map, the co-ordinate information of the first key-point may include: performing a regression computation based on the grid probability, the horizontal co-ordinate and the vertical co-ordinate of the grid center pixel corresponding to each grid in the preset classification map, to obtain the co-ordinate information of the first key-point.

Further, in some embodiments, the step of performing the regression computation based on the grid probability, the horizontal co-ordinate and the vertical co-ordinate of the grid center pixel corresponding to each grid in the preset classification map, to obtain the co-ordinate information of the first key-point may include: obtaining the horizontal co-ordinate information of the first key-point by a second computation model, based on the grid probability and the horizontal co-ordinate of the grid center pixel corresponding to each grid in the preset classification map; obtaining the vertical co-ordinate information of the first key-point by a third computation model, based on the grid probability and the vertical co-ordinate of the grid center pixel corresponding to each grid in the preset classification map; and obtaining the co-ordinate information of the first key-point, based on the horizontal co-ordinate information of the first key-point and the vertical co-ordinate information of the first key-point.

It should be noted that, the regression computation may be achieved by the preset regression model. In other words, based on the grid probability, the horizontal co-ordinate and the vertical co-ordinate of the grid center pixel corresponding to each grid in the preset classification map, the coordinate information of the first key-point may be obtained by a preset regression model.

In some embodiments of the present disclosure, the preset regression model may be obtained by model-training the regression model using the training sample set. Here, the preset regression model may include the second computation model and the third computation model. Here, the second computation model may be configured to compute the horizontal co-ordinate of the first key-point, the third computation model may be configured to compute the vertical co-ordinate of the first key-point.

That is, for the first key-point, the horizontal co-ordinate information of the first key-point may be computed by the second computation model with the grid probability and the horizontal co-ordinate of the grid center pixel corresponding to each grid in the preset classification map. Specifically, the step of obtaining the horizontal co-ordinate information of the first key-point by the second computation model, based on the grid probability and the horizontal co-ordinate of the grid center pixel corresponding to each grid in the preset classification map may include: computing a weighted sum for the grid probability and the horizontal co-ordinate of the grid center pixel corresponding to each grid in the preset classification map by the second computation model, and determining the computed weighted sum value as the horizontal co-ordinate information of the first key-point.

It should be noted that, the computational formula of the second computation model may be as follows:

$$x = \Sigma_i p_i * C_{ix} \tag{4}$$

Here, i may represent the i-th grid in the preset classification map, $i \in \{0, 1 \ldots, 15\} \times \{0, 1, \ldots, 15\}$.

As shown by formula (4), the step of computing a weighted sum for the grid probability and the horizontal co-ordinate of the grid center pixel corresponding to each grid in the preset classification map by the second computation model may include: computing the weighted sum of the horizontal co-ordinate of the grid center pixel corresponding to each grid in the preset classification map, wherein the horizontal co-ordinate of the grid center pixel corresponding to each grid is weighted by the grid probability of the grid.

It should also be noted that, for the first key-point, the vertical co-ordinate information of the first key-point may be computed by the third computation model with the grid probability and the vertical co-ordinate of the grid center pixel corresponding to each grid in the preset classification map. In some embodiments, the step of obtaining the vertical co-ordinate information of the first key-point by the third computation model, based on the grid probability and the vertical co-ordinate of the grid center pixel corresponding to each grid in the preset classification map may include: computing a weighted sum for the grid probability and the vertical co-ordinate of the grid center pixel corresponding to each grid in the preset classification map by the third computation model, and determining the computed weighted sum value as the vertical co-ordinate information of the first key-point.

It should be noted that, the computational formula of the third computation model may be as follows:

$$y = \Sigma_i p_i * C_{iy} \tag{5}$$

Here, i may represent the i-th grid in the preset classification map, $i \in \{0, 1 \ldots, 15\} \times \{0, 1, \ldots, 15\}$.

As shown by formula (5), the step of computing a weighted sum for the grid probability and the vertical co-ordinate of the grid center pixel corresponding to each grid in the preset classification map by the third computation model may include: computing the weighted sum of the vertical co-ordinate of the grid center pixel corresponding to each grid in the preset classification map, wherein the vertical co-ordinate of the grid center pixel corresponding to each grid is weighted by the grid probability of the grid.

It should be noted that, formulas (4) and (5) are configured to achieve normalization, which outputs the co-ordinate information (x, y) of the first key-point. x may represent the horizontal co-ordinate information of the first key-point. y may represent the vertical co-ordinate information of the first key-point.

In this way, for any one of the key-points, the co-ordinate information of it may be obtained by performing the operations S902 and S903. For the plurality of key-points, the corresponding co-ordinate information of each of the plurality of key-points may be obtained by performing the operations S902 and S903 for multiple times.

At block S903: obtaining the pose estimation result of the target hand, after determining the corresponding co-ordinate information of each of the plurality of key-points.

It should be noted that, after the corresponding co-ordinate information of each of the plurality of the key-points is obtained, which commonly is the corresponding co-ordinate information of each of the 20 key-points as shown in FIG. 3, the pose estimation of the target hand may be achieved, such as the pose estimation result of the target hand as shown in FIG. 4.

Further, if the co-ordinate information of each key-point is a 3D co-ordinate, which can include the co-ordinate in the depth direction (denoted by z) in addition to (x, y). That is, the co-ordinate information of each key-point is (x, y, z), then the 3D pose estimation result of the target hand may be obtained now.

A hand pose estimation method may be provided according to some embodiments of the present embodiment. A classification logic map corresponding to each of the plurality of key-points may be determined. The plurality of key-points may represent key nodes of the target hand skeleton. The first key-point may be any one of the plurality of key-points. The co-ordinate information of the first key-point may be determined based on a preset classification map and the classification logic map corresponding to the first key-point. The pose estimation result of the target hand may be obtained, after the corresponding co-ordinate information of each of the plurality of key-points is determined. In this way, for each key-point, a classification may be firstly performed with the classification logic map, then the co-ordinate information of the key-point may be determined with a regression model. After the corresponding co-ordinate information of each of the plurality of key-points is determined, the pose estimation result of the target hand may be obtained. Thus, by considering both the classification approach and the regression approach, the accuracy of the hand pose estimation may be enhanced, and a hand pose estimation result with a high accuracy may be obtained.

Figure 13:
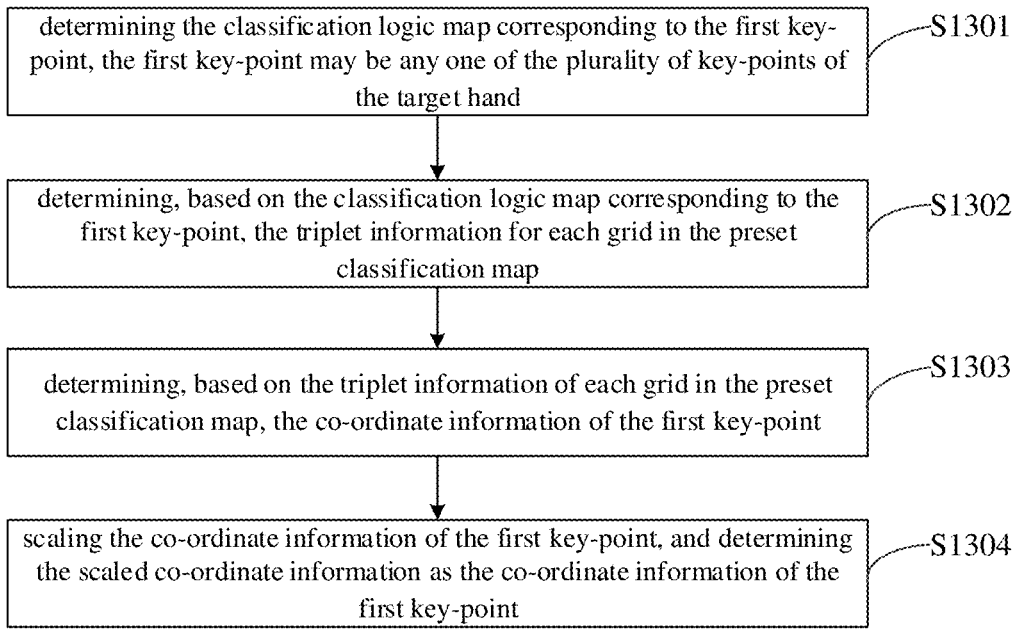
FIG. 13 is a flow chart of a hand pose estimation method according to another embodiment of the present disclosure.

Referring to FIG. 13, a schematic flowchart of another hand pose estimation method according to some other embodiments of the present disclosure is illustrated. The method may include the following operations at blocks shown in FIG. 13.

At block S1301: determining the classification logic map corresponding to the first key-point. The first key-point may be any one of the plurality of key-points of the target hand.

At block S1302: determining, based on the classification logic map corresponding to the first key-point, the triplet information for each grid in the preset classification map.

At block S1303: determining, based on the triplet information of each grid in the preset classification map, the co-ordinate information of the first key-point.

It should be noted that, the first key-point may be any one of the plurality of key-points. The co-ordinate information of the first key-point may be computed by the operations S1302 and S1303, after the classification logic map corresponding to the first key-point is obtained. The triplet information may include the grid probability (denoted by $p_i$), the horizontal co-ordinate (denoted by $C_{ix}$) and the vertical co-ordinate (denoted by $C_{iy}$) of the grid center pixel. i may represent the i-th grid in the preset classification map, $i \in \{0, 1 \ldots, 15\} \times \{0, 1, \ldots, 15\}$.

In this way, the co-ordinate information of the first key-point may be obtained based on the triplet information of each grid in the preset classification map, in conjunction with the above-mentioned formula (4) and formula (5).

At block S1304: scaling the co-ordinate information of the first key-point, and determining the scaled co-ordinate information as the co-ordinate information of the first key-point.

It should be noted that, after the co-ordinate information of the first key-point is obtained, it may be scaled (i.e., multiply), then the scaled co-ordinate information may be determined as the co-ordinate information of the first key-point.

In some embodiments, the co-ordinate information of the first key-point may include the horizontal co-ordinate information of the first key-point and the vertical co-ordinate information of the first key-point. Further, the step of scaling the co-ordinate information of the first key-point, and determining the scaled co-ordinate information as the co-ordinate information of the first key-point may include: scaling the horizontal co-ordinate information of the first key-point by a first preset value, to obtain the scaled horizontal co-ordinate information of the first key-point; scaling the vertical co-ordinate information of the first key-point by a second preset value, to obtain the scaled vertical co-ordinate information of the first key-point; and obtaining the co-ordinate information of the first key-point, based on the scaled horizontal co-ordinate information of the first key-point and the scaled vertical co-ordinate information of the first key-point.

Here, the values of the first preset value and the second preset value may be same or different. The first preset value may be configured for performing scaling on the horizontal co-ordinate information of the first key-point. That is, the horizontal co-ordinate information of the first key-point may be multiplied by the first preset value. The second preset value may be configured for performing scaling on the vertical co-ordinate information of the first key-point. That is, the vertical co-ordinate information of the first key-point may be multiplied by the second preset value.

In some embodiments of the present disclosure, the first preset value and the second preset value may be determined based on a ratio of the size parameter of the bounding box of the target hand and the dimensional parameter of the preset classification map. In some embodiments, the method may further include: acquiring the size parameter of the bounding box containing the target hand and the dimensional parameter of the preset classification map; computing a first ratio of the size parameter of the bounding box and the dimensional parameter of the preset classification map along the horizontal direction, and assigning the first ratio as the first preset value; and computing a second ratio of the size parameter of the bounding box and the dimensional parameter of the preset classification map along the vertical direction, and assigning the second ratio as the second preset value.

It should be noted that, assuming the size parameter of the bounding box of the target hand is denoted by ($W_B$, $H_B$), the dimensional parameter of the preset classification map is (112, 112), then the first preset value may be $W_B/112$, and the second preset value may be $H_B/112$. At this time, the horizontal co-ordinate information of the first key-point may be multiplied by $W_B/112$, the vertical co-ordinate information of the first key-point may be multiplied by $H_B/112$, to obtain the scaled co-ordinate information of the first key-point.

In this way, for any one of the key-points, the co-ordinate information of it may be obtained by performing the operations S1301~S1304. For the plurality of key-points, by performing operations S1301~S1304 for multiple times, e.g., each time for a key-point, then the co-ordinate information corresponding to each of the plurality of key-points may be obtained. In this way, after the co-ordinate information corresponding to each of the plurality of the key-points is obtained, the pose estimation of the target hand may be achieved. The pose estimation may be such as the pose estimation result of the target hand as shown in FIG. 4. At this time, if the co-ordinate information of each key-point is a 3D co-ordinate, which can include the co-ordinate in the depth direction (denoted by z) in addition to (x, y), i.e., the co-ordinate information of each key-point is (x, y, z), then the 3D pose estimation result of the target hand may be obtained now.

A hand pose estimation method may be provided according to some embodiments of the present embodiment. The specific implementations of the foregoing embodiments are elaborated by the above embodiments. From these embodiments, it can be seen that, by the technical schemes of the foregoing embodiments, for each key-point, a classification may be firstly performed with the classification logic map, then the co-ordinate information of the key-point may be determined with the regression model. After the corresponding co-ordinate information of each of the plurality of key-points is determined, the pose estimation result of the target hand may be obtained. Thus, by considering both the classification approach and the regression approach, the accuracy of the hand pose estimation may be enhanced, and the hand pose estimation result with a high accuracy may be obtained.

Figure 14:
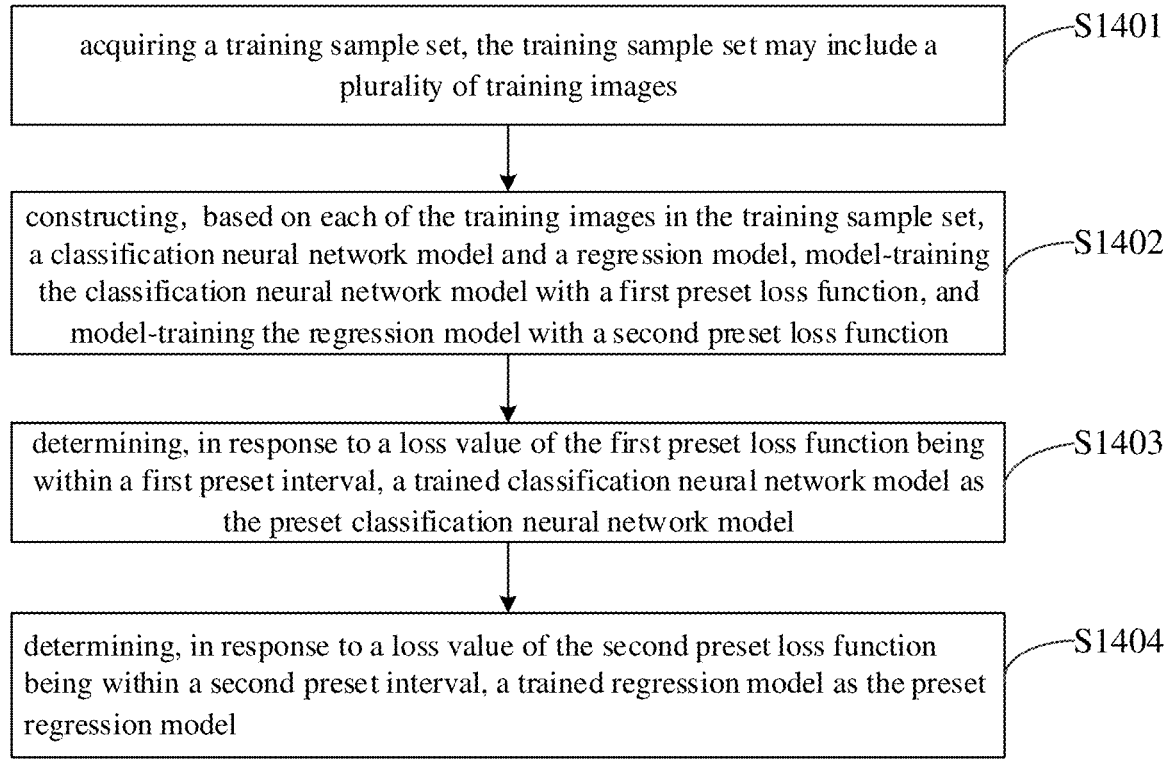
FIG. 14 is a flow chart of a hand pose estimation method according to a further embodiment of the present disclosure.

Referring to FIG. 14, a schematic flowchart of the hand pose estimation method according to a further embodiment of the present disclosure is illustrated. The method may include the following operations at blocks shown in FIG. 14.

At block S1401: acquiring a training sample set. The training sample set may include a plurality of training images.

At block S1402: constructing, based on each of the training images in the training sample set, a classification neural network model and a regression model, model-training the classification neural network model with a first preset loss function, and model-training the regression model with a second preset loss function.

At block S1403: determining, in response to a loss value of the first preset loss function being within a first preset interval, a trained classification neural network model as the preset classification neural network model.

At block S1404: determining, in response to a loss value of the second preset loss function being within a second preset interval, a trained regression model as the preset regression model.

It should be noted that, the first preset loss function may be the cross-entropy over softmax loss function, the second preset loss function may be the smooth-L1 loss function.

It should also be noted that, a Convolutional Neural Network (CNN) is a class of Feedforward Neural Networks that include convolutional computation and have deep structures. And the CNN is one of the representative algorithms of Deep Learning. Moreover, CNNs are capable of representation learning and shift-invariant classification of input information according to their hierarchical structure, hence CNNs are also referred to as "Shift-Invariant Artificial Neural Networks (SIANN)".

It should be appreciated that, the convolutional neural network may consist of an input layer and an output layer, as well as multiple hidden layers. The hidden layers of a CNN may typically consist of a series of convolutional layers that convolve with a multiplication or other dot product. The activation function may commonly be a Rectified Linear Unit (RELU) layer, and may be subsequently followed by additional convolutional layers such as pooling layers, fully-connected layers and normalization layers. Since their inputs and outputs are masked by the activation function and final convolutional layer, they are also referred to as hidden layers. The final convolutional layer, in turn, may often involve backpropagation, in order to more accurately weight the end product. Although these layers are colloquially referred to as convolutions, this is only a convention. Mathematically, it is technically a sliding dot product or cross-correlation. This has significance for the indices in the matrix, in that it affects how weight is determined at a specific index point.

When programming a CNN, each convolutional layer within a neural network should have the following attributes: (1) The input is a tensor with shape (number of images)×(image width)×(image height)×(image depth). (2) The width and height of a convolutional kernel are hyperparameters, and the depth of the convolutional kernel must be equal to that of the image. Convolutional layers may convolve the input and pass its result to the next layer. This is similar to the response of a neuron in the visual cortex to a specific stimulus.

It should be noted that, each convolutional neuron only processes data for its receptive field. Although fully-connected feedforward neural networks can be used to learn features as well as classify data, it is not practical to apply this architecture to images. A very high number of neurons would be necessary, even in a shallow (opposite of deep) architecture, due to the very large input sizes associated with images. In the architecture, each pixel is a relevant variable. For instance, a fully-connected layer for a (small) image of size 100×100 has 10,000 weights for each neuron in the second layer. The convolution operation brings a solution to this problem as it reduces the number of free parameters, allowing the network to be deeper with fewer parameters. For instance, regardless of the image size parameters, tiling regions of size 5×5 (each with the same shared weights) may require only 25 learnable parameters. In this way, this method resolves, by using backpropagation, the vanishing or exploding gradients problem in training traditional multi-layer neural networks with many layers.

Further, convolutional neutral networks may include local or global pooling layers to streamline the underlying computation. Pooling layers may reduce the dimensions of the data by combining the outputs of neuron-clusters at one layer into a single neuron in the next layer. Local pooling may combine typical 2×2 small clusters. Global pooling may act on all the neurons of the convolutional layer. In addition, pooling may compute a max or an average. Max pooling may use the maximum value of each neuron-cluster at the prior layer. Average pooling may use the average value of each neuron-cluster at the prior layer.

It should also be noted that, fully-connected layers may connect every neuron in one layer to every neuron in another layer. It is in principle the same as the traditional multi-layer perceptron (MLP) neural network. The flattened matrix may go through the fully-connected layer to classify the images.

In model training, a common loss function today is a cross-entropy over softmax loss, or log loss. The cross-entropy over softmax loss function may measure the performance of a classification neural network model. The output of the classification neural network model may be a probability between 0 and 1. The cross-entropy may be used to determine how close the actual output is to the desired output. Cross-entropy loss may increase as the predicted probability diverges from the actual label. So, when the actual observation label is 1, predicting a probability of 0.012 would indicate that the classification result is bad and result in a high loss value. A perfect model would have a desired log loss of 0. The specific formula of the loss function is:

$$-\Sigma_{c=1}^{M} y_{o,c} \log(p_{o,c}) \tag{6}$$

Wherein, M may represent the number of classes (e.g., dog, cat, fish), log may represent the natural log, y may represent the binary indicator (0 or 1) if the class label c is the correct classification for observation oo, and p may represent the predicted probability that the observation oo is of the class c.

In some embodiments, for the training of the classification neural network model, the method may include: feeding each training image in the training sample set into the classification neural network model, to obtain a classification logic map for each key-point in each training image; determining the predicted probability of each key-point in each training image, based on the classification logic map of each key-point in each training image; computing, based on the predicted probability of each key-point in each training image, the loss value of the classification neural network model by the cross-entropy over softmax loss function; in response to the loss value not being within the first preset interval, updating model parameters of the classification neural network model according to the loss value, continuing the operation of feeding each of the training images in the training sample set into the classification neural network model, until the loss value is within the first preset interval; and in response to the loss value being within the first preset interval, obtaining a trained classification neural network model, and determining the trained classification neural network model as the preset classification neural network model.

That is, the training process of the classification neural network model may be supervised using the cross-entropy over softmax loss function shown in equation (6), to ensure that the loss value of the preset classification neural network model obtained after the training process is within the first preset interval, and to improve the classification accuracy of each key-point.

It should also be noted that, the smooth-L1 loss function is typically used for regression. Specifically, the prediction of the bounding box is a regression problem. The Mean Squared Error (MSE) loss function (L2 loss) may usually be chosen, but this kind of loss may impose slightly high penalties on relatively large errors. A slightly more moderated absolute loss function (L1 loss) may also be used. The loss value of L1 loss function may grow with error linearly rather than squarely. However, the derivative of L1 loss function does not exist at zero point, which may affect its convergence. Therefore, a common solution is a piecewise function, namely the Smooth L1 loss function. A mean squared error function is used around the zero point, to make the piecewise function smoother. In other words, the Smooth L1 loss function is less sensitive to outliers than the MSE, as the Smooth L1 loss function treats error as square only inside an interval. The specific formula of the Smooth L1 loss function is:

$$L_\delta = \begin{cases} \frac{1}{2}(y - \hat{y})^2 & \text{if } |y - \hat{y}| < \delta \\ \delta\left((y - \hat{y}) - \frac{1}{2}\delta\right) & \text{otherwise} \end{cases} \quad (7)$$

Wherein, $L_\delta$ denotes the loss value, y denotes the true value, $\hat{y}$ denotes the predicted value and $\delta$ denotes the preset constant value. $\delta$ may usually be equal to 1.

In some embodiments, for the training of the classification neural network model, the method may include: feeding each training image in the training sample set into the regression model, to obtain a predicted co-ordinate information for each key-point in each training image; computing, based on a degree of difference between the predicted co-ordinate information and the true co-ordinate information for each key-point in each training image, the loss value of the regression model by the Smooth-L1 loss function; in response to the loss value not being within the second preset interval, updating model parameters of the regression model according to the loss value, and continuing the operation of feeding each of the training images in the training sample set into the regression model, until the loss value is within the second preset interval; and in response to the loss value being within the second preset interval, obtaining a trained regression model, and determining the trained regression model as the preset regression model.

In other words, in the training sample set, each training image may include a plurality of key-points of the hand and true co-ordinate information corresponding to the plurality of key-points. The training process of the regression model may be supervised using the Smooth-L1 loss function shown in equation (7), to ensure that the loss value of the preset regression model obtained after the training process is within the second preset interval, and may improve the co-ordinate information accuracy of each key-point.

In this way, after the preset classification neural network model and the preset regression model is obtained through training, a classification logic map of each key-point may be obtained by the preset classification neural network model, and a preset classification map may be defined. Then for the classification logic map of each key-point, the triplet information of each grid in the preset classification map corresponding to the classification logic map may be determined. At the same time, the co-ordinate information of each key-point may be normalized by combining the preset regression model, to obtain the co-ordinate information of each key-point, and to achieve the hand pose estimation.

In short, in some embodiments of the present disclosure, the hand pose estimation method may mainly include the following design rules.

Rule #1: The cascaded classification and regression method performs pose estimation based on the previous segmentation head. After the segmentation head, the 16×16×128 feature are convolved with a 1×1×20 convolution, to output the 16×16×20 classification logic map Y={$y_i$}, i∈ {0, 1 . . . , 15}×{0, 1, . . . , 15}. For each of the 20 key-points, there is one corresponding 16×16 classification logic map. A network architecture according to an embodiment of the present disclosure is shown in FIG. 11.

Figure 12:
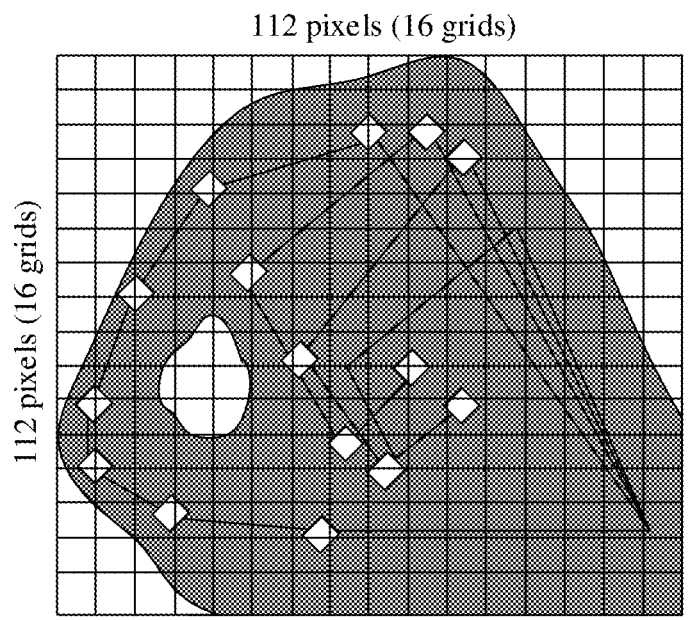
FIG. 12 is a schematic structural diagram of a classification map according to an embodiment of the present disclosure.

Rule #2: In some embodiments of the present disclosure, a classification map S={$t_i$}, i∈ {0, 1 . . . , 15}×{0, 1, . . . , 15} is pre-defined to include the output classification logic map, the grid center pixel co-ordinate information of each grid in the classification map. The classification map may be shaped in 112×112 pixels, and 16×16 grids. Each grid may account for 7×7 pixels. Each grid $t_i$ may be associated with a triplet ($p_i$, $C_{ix}$, $C_{iy}$). Wherein, $p_i$ is grid probability, $C_{ix}$ is the horizontal co-ordinate of the grid center, and $C_{iy}$ is the vertical co-ordinates of the grid center. An example architecture of the classification map according to an embodiment of the present disclosure is shown in FIG. 12.

Rule #3: In rule #2, the grid probability may be computed by the softmax function of the classification logic map $$p_i = \frac{e^{-y_i}}{\sum_j e^{-y_j}}.$$

Rule #4: Each key-point co-ordinate (x, y) is computed by x=$\Sigma_i p_i * c_{ix}$, y=$\Sigma_i p_i * c_{iy}$.

Rule #5: During a process of inferring, the key-point co-ordinate (x, y) is scaled (i.e., multiply) by the ratio of detected bounding box size parameter ($W_B$, $H_B$) and the classification map dimensional parameter (112, 112) (e.g., ($W_B$/112, $H_B$/112)).

Rule #6: During a process of training, the classification logic map is supervised by the cross-entropy over softmax loss function, and the key-point co-ordinate (x, y) is supervised by the smooth-L1 loss function.

A hand pose estimation method may be provided according to some embodiments of the present embodiment. The specific implementations of the foregoing embodiments are elaborated by the above embodiments. From these embodiments, it can be seen that, by the technical solutions of the foregoing embodiments, for each key-point, a classification may be firstly performed with the classification logic map, then the co-ordinate information of the key-point may be determined with a regression model. After the co-ordinate information corresponding to each of the plurality of key-points is determined, the pose estimation result of the target hand may be obtained. Thus, by considering both the classification approach and the regression approach, the accuracy of the hand pose estimation may be enhanced, and the hand pose estimation result with a high accuracy may be obtained.

Figure 15:
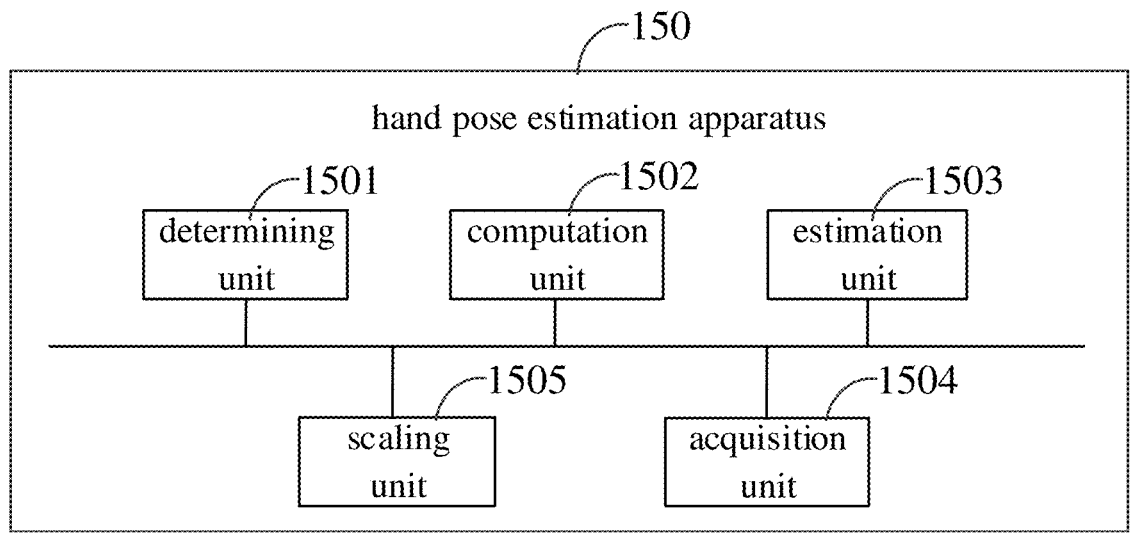
FIG. 15 is a schematic structural diagram showing a composition of a hand pose estimation apparatus according to an embodiment of the present disclosure.

According to a further embodiment of the present disclosure, as shown in FIG. 15, based on a same inventive concept with the preceding embodiments, a schematic diagram of the composition structure of a hand pose estimation apparatus 150 according to an embodiment of the present disclosure is illustrated. As shown in FIG. 15, the hand pose estimation apparatus 150 may include a determining unit 1501, a computation unit 1502 and an estimation unit 1503.

The determining unit 1501 may be configured for determining the classification logic map corresponding to each of the plurality of key-points. The plurality of key-points may represent key nodes of the target hand skeleton. The first key-point may be any one of the plurality of key-points.

The computation unit 1502 may be configured for determining, based on the preset classification map and the classification logic map corresponding to the first key-point, the co-ordinate information of the first key-point.

The estimation unit 1503 may be configured for obtaining the pose estimation result of the target hand, after determining the co-ordinate information corresponding to each of the plurality of key-points.

In some embodiments, referring to FIG. 15, the hand pose estimation apparatus 150 may further include an acquisition unit 1504, configured for acquiring the feature map corresponding to the target hand.

The computation unit 1502 may be further configured for performing a classification process on the plurality of key-points in the feature map, and obtaining the classification logic map corresponding to each of the plurality of key-points.

In some embodiments, the acquisition unit 1504 may further be configured for acquiring the depth image including the target hand.

The computation unit 1502 may be further configured for performing the hand detection process on the depth image using the preset feature extractor, to obtain the initial feature map containing the target hand; and convolving the initial feature map using the head segmentation model, to obtain the feature map corresponding to the target hand.

In some embodiments, the determining unit 1501 may be specifically configured for determining, based on the classification logic map corresponding to the first key-point, the triplet information for each grid in the preset classification map; and determining, based on the triplet information of each grid in the preset classification map, the co-ordinate information of the first key-point.

In some embodiments, the triplet information may include the grid probability, the horizontal co-ordinate and the vertical co-ordinate of the grid center pixel.

In some embodiments, the computation unit 1502 may be further configured for computing, based on the classification logic map corresponding to the first key-point, the grid probability corresponding to each grid by the first computation model.

The acquisition unit 1504 may be further configured for acquiring the horizontal co-ordinate and the vertical co-ordinate of the grid center pixel corresponding to each grid.

The determining unit 1501 may also be further configured for composing, based on the grid probability, the horizontal co-ordinate and the vertical co-ordinate of the grid center pixel corresponding to each grid, the triplet information of each grid in the preset classification map.

In some embodiments, the computation unit 1502 may be further configured for performing, based on the grid probability, the horizontal co-ordinate and the vertical co-ordinate of the grid center pixel corresponding to each grid in the preset classification map, the regression computation, to obtain the co-ordinate information of the first key-point.

Further, the computation unit 1502 may be specifically configured for obtaining, the horizontal co-ordinate information of the first key-point by the second computation model, based on the grid probability, the horizontal co-ordinate of the grid center pixel corresponding to each grid in the preset classification map; and obtaining the vertical co-ordinate information of the first key-point by the third computation model, based on the grid probability and the vertical co-ordinate of the grid center pixel corresponding to each grid in the preset classification map.

The determining unit 1501 may be further configured for obtaining the co-ordinate information of the first key-point, based on the horizontal co-ordinate information of the first key-point and the vertical co-ordinate information of the first key-point.

In some embodiments, the computation unit 1502 may be specifically configured for computing a weighted sum of the grid probability and the horizontal co-ordinate of the grid center pixel corresponding to each grid in the preset classification map by the second computation model, and determining the computed weighted sum value as the horizontal co-ordinate information of the first key-point.

In some embodiments, the computation unit 1502 may be specifically configured for computing a weighted sum of the grid probability and the vertical co-ordinate of the grid center pixel corresponding to each grid in the preset classification map by the third computation model, and determining the computed weighted sum value as the vertical co-ordinate information of the first key-point.

In some embodiments, referring to FIG. 15, the hand pose estimation apparatus 150 may further include a scaling unit 1505, configured for scaling the co-ordinate information of the first key-point, and determining the scaled co-ordinate information as the co-ordinate information of the first key-point.

In some embodiments, the co-ordinate information of the first key-point may include the horizontal co-ordinate information of the first key-point and the vertical co-ordinate information of the first key-point.

The scaling unit 1505 may be specifically configured for: scaling the horizontal co-ordinate information of the first key-point by a first preset value, to obtain the scaled horizontal co-ordinate information of the first key-point; and scaling the vertical co-ordinate information of the first key-point by a second preset value, to obtain the scaled vertical co-ordinate information of the first key-point.

The determining unit 1501 may be further configured for obtaining the co-ordinate information of the first key-point, based on the scaled horizontal co-ordinate information of the first key-point and the scaled vertical co-ordinate information of the first key-point.

In some embodiments, the acquisition unit 1504 may further configured for acquiring the size parameter of the bounding box containing the target hand and the dimensional parameter of the preset classification map.

The computation unit 1502 may be further configured for: computing a first ratio of the size parameter of the bounding box and the dimensional parameter of the preset classification map along the horizontal direction, and assigning the first ratio as the first preset value; and computing a second ratio of the size parameter of the bounding box and the dimensional parameter of the preset classification map along the vertical direction, and assigning the second ratio as the second preset value.

It should be appreciated that, in embodiments of the present disclosure, a "unit" may be a part of a circuit, a part of a processor, a part of a program or software, etc. Of course, the "unit" may be a module, or it may be non-modularized. In addition, each integral part in embodiments of the present disclosure may be integrated into one processing unit, or may be physically separated units, or two or more units may be integrated into one unit. The above-mentioned integrated units may be embodied in the form of hardware or software function model.

If the integrated units are implemented in the form of software functional units, and are not sold or used as independent product, then they could be stored in a computer-readable storage medium. Based on such kind of understanding, the technical solution of the present embodiment essentially or a part of it contributing to the prior art or part or all of it may be embodied in the form of a software product. The computer software product may be stored in one storage medium. The computer software product may include several instructions. These instructions may enable a computer device (which may be a personal computer, a server, or a network device etc) or a processor to implement all or a part of the steps of the method according to the present embodiment. The afore-mentioned storage medium may include: a U disk, a mobile hard disk drive, a Read Only Memory (ROM), a Random Access Memory (RAM), a magnetic disk or CD-ROM and other media that can store program codes.

Therefore, a kind of non-transitory computer-readable storage medium may be provided according to some embodiments of the present embodiment. The storage medium may store a hand pose estimation program. The hand pose estimation program when being executed by at least a processor may achieve the steps of the method as disclosed in any one of the afore-mentioned embodiments.

Figure 16:
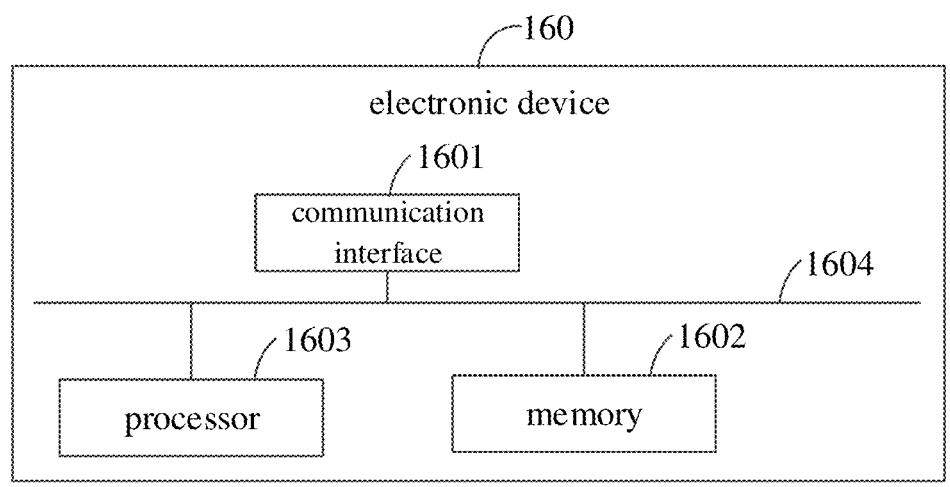
FIG. 16 is a schematic diagram of a specific hardware structure of an electronic device according to an embodiment of the present application.

Based on the composition of the hand pose estimation apparatus 150 and the storage medium mentioned above, referring to FIG. 16. FIG. 16 is a schematic diagram of a specific hardware structure of an electronic device 160 according to an embodiment of the present disclosure. As shown in FIG. 16, the electronic device 160 may include: a communication interface 1601, a memory 1602 and a processor 1603. These components may be coupled together by a bus system 1604. It should be appreciated that, the bus system 1604 may be configured to enable the connection and communication between these components. In addition to a data bus, the bus system 1604 may further include a power bus, a control bus and a status signal bus. However, for the sake of clarity, all kinds of buses are denoted in FIG. 16 as the bus system 1604.

The communication interface 1601 may be configured for reception and transmission of signals in the process of sending/receiving information to/from other external network elements.

The memory 1602 may be configured to store executable instructions that can be executed by the processor 1603.

The processor 1603 may be configured to execute the executable instructions, and to implement: determining the classification logic map corresponding to each of the plurality of key-points; the plurality of key-points may represent key nodes of the target hand skeleton, the first key-point may be any one of the plurality of key-points; determining, based on a preset classification map and the classification logic map corresponding to the first key-point, the co-ordinate information of the first key-point; and obtaining the pose estimation result of the target hand, after determining the corresponding co-ordinate information of each of the plurality of key-points.

It should be appreciated that, the memory 1602 in some embodiments of the present disclosure may be volatile memory or non-volatile memory, or may include both volatile and non-volatile memories. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which may be used as an external cache. By way of illustration but not limitation, many forms of RAMs are available, such as Static RAMs (SRAM), Dynamic RAMs (DRAM), Synchronous DRAMs (SDRAM), Double Data Rate SDRAMs (DDRSDRAM), Enhanced SDRAMs (ESDRAM), Synchronous link DRAMs (SLDRAM) and Direct Rambus RAMs (DRRAM). The memory 1602 of the systems and methods described herein is intended to include, but not limited to, these and any other suitable types of memories.

The processor 1603 may be an integrated circuit chip with signal processing capability. During implementation, the steps of the above-mentioned method may be accomplished by an integrated logic circuitry in hardware-form or by instructions in software-form in the processor 1603. The above-mentioned processor 1603 may be a General Purpose Processor, a Digital Signal Processor (DSP), an Application Specific Integrated Circuit (ASIC), a Field Programmable Gate Array (FPGA) or other programmable logic device, a discrete gate or a transistor logic device, a discrete hardware component. The processor 1603 may realize or implement various methods, steps or logical block diagrams disclosed in embodiments of the present disclosure. The general purpose processor may be a micro-processor, or the processor may also be any kind of conventional processor, etc. The steps of methods disclosed in conjunction with the embodiments of the present disclosure may be performed directly by the hardware decoding processor, or by a combination of hardware and software modules in the decoding processor. The software module may be located in a random memory, a flash memory, a read-only memory, a programmable read-only memory or an electrically erasable and programmable memory, a register and other storage media proven in the technical field. The storage medium is located in the memory 1602. The processor 1603 may read the information in the memory 1602 and complete the steps of the above-mentioned method in combination with its hardware.

It should be appreciated that, these embodiments described herein may be implemented with hardware, software, firmware, middleware, microcode, or combinations thereof. As for hardware implementations, the processing unit may be implemented in one or more Application Specific Integrated Circuits (ASIC), Digital Signal Processors (DSP), Digital Signal Processing Devices (DSPD), Programmable Logic Devices (PLD), Field-Programmable Gate Arrays (FPGA), General Purpose Processors, controllers, micro-controllers, micro-processors, and other electronic devices configured for performing functions described in the present disclosure or a combination thereof.

As for software implementations, the techniques described herein may be implemented by modules (e.g., procedures, functions, etc.) that perform the functions described herein. The software code may be stored in the memory and executed by the processor. The memory may be implemented in the processor or outside the processor.

Optionally, as another embodiment, the processor 1603 may be further configured to perform the steps of the method described in any of the afore-mentioned embodiments when running the computer program.

It should be noted that, in the present disclosure, the terms "including", "comprising", or any other variation thereof are intended to cover non-exclusive inclusion. Thus, a process, a method, an article or an apparatus comprising a set of elements includes not only those elements, but also other elements not expressly listed, or elements inherent to such a process, a method, an article or an apparatus. Without further limitation, an element defined by the statement "including a" does not preclude the existence of another identical element in the process, method, article or apparatus that includes that element.

The above sequence numbers of the embodiments of the present disclosure are for the purpose of description only, and do not represent the advantages or disadvantages of the embodiments.

The methods disclosed according to several method embodiments of the present disclosure may be combined at will, to obtain a new method embodiment without conflict.

The features disclosed according to several product embodiments of the present disclosure may be combined at will, to obtain a new product embodiment without conflict.

The features disclosed according to several method or apparatus embodiments of the present disclosure may be combined at will, to obtain a new method or apparatus embodiment without conflict.

The above are only specific implementations of the present disclosure, and the protection scope of the present disclosure is not limited thereto. Changes or alternations within the technical scope of the present disclosure could easily occur to those skilled in the art and should be considered to be in the protection scope of the present disclosure. Therefore, the protection scope of the present disclosure should be subject to the appended claims.

INDUSTRIAL APPLICABILITY

In the embodiments of the present disclosure, firstly determining the classification logic map corresponding to each of the plurality of key-points; the first key-point may be any one of the plurality of key-points of the target hand. Then determining, based on a preset classification map and the classification logic map corresponding to the first key-point, the co-ordinate information of the first key-point, and obtaining the pose estimation result of the target hand, after determining the corresponding co-ordinate information of each of the plurality of key-points. In this way, for each key-point, a classification may be first performed with the classification logic map, then the co-ordinate information of the key-point may be determined by a regression model, and after the corresponding co-ordinate information of each of the plurality of key-points is determined, the pose estimation result of the target hand may be obtained. Thus, by considering both the classification approach and the regression approach, the accuracy of the hand pose estimation may be enhanced, and a hand pose estimation result with a high accuracy may be obtained.

What is claimed is:

1. A hand pose estimation method, comprising:
determining a classification logic map corresponding to each of a plurality of key-points, and selecting a key-point of the plurality of key-points as a first point; wherein the plurality of key-points represent key nodes of a skeleton of a target hand;
determining, based on a preset classification map and the classification logic map corresponding to the first key-point, co-ordinate information of the first key-point; and
obtaining a pose estimation result of the target hand, after determining co-ordinate information corresponding to each of the plurality of key-points;
wherein the determining, based on the preset classification map and the classification logic map corresponding to the first key-point, the co-ordinate information of the first key-point comprises:
determining, based on the classification logic map corresponding to the first key-point, triplet information for each grid in the preset classification map; and
determining, based on the triplet information of each grid in the preset classification map, the co-ordinate information of the first key-point;

the triplet information comprises a grid probability, a horizontal co-ordinate and a vertical co-ordinate of a grid center pixel.

2. The method as claimed in claim 1, wherein the determining the classification logic map corresponding to each of the plurality of key-points comprises:
acquiring a feature map corresponding to the target hand; and
performing a classification process on the plurality of key-points in the feature map, and obtaining a classification logic map corresponding to each of the plurality of key-points.

3. The method as claimed in claim 2, wherein the acquiring the feature map corresponding to the target hand comprises:
acquiring a depth image comprising the target hand;
performing a hand detection process on the depth image by a preset feature extractor, and obtaining an initial feature map comprising the target hand; and
convolving the initial feature map by a head segmentation model, and obtaining the feature map corresponding to the target hand.

4. The method as claimed in claim 1, wherein the determining, based on the classification logic map corresponding to the first key-point, the triplet information for each grid in the preset classification map comprises:
computing, based on the classification logic map corresponding to the first key-point, a grid probability corresponding to each grid by a first computation model;
acquiring the horizontal co-ordinate and the vertical co-ordinate of the grid center pixel corresponding to each grid; and
composing, based on the grid probability, the horizontal co-ordinate and the vertical co-ordinate of the grid center pixel corresponding to each grid, the triplet information of each grid in the preset classification map.

5. The method as claimed in claim 1, wherein the determining, based on the triplet information of each grid in the preset classification map, the co-ordinate information of the first key-point comprises:
performing a regression computation based on the grid probability, the horizontal co-ordinate and the vertical co-ordinate of the grid center pixel corresponding to each grid in the preset classification map, to obtain the co-ordinate information of the first key-point.

6. The method as claimed in claim 5, wherein the performing the regression computation based on the grid probability, the horizontal co-ordinate and the vertical co-ordinate of the grid center pixel corresponding to each grid in the preset classification map, to obtain the co-ordinate information of the first key-point comprises:
obtaining the horizontal co-ordinate information of the first key-point by a second computation model, based on the grid probability and the horizontal co-ordinate of the grid center pixel corresponding to each grid in the preset classification map;
obtaining the vertical co-ordinate information of the first key-point by a third computation model, based on the grid probability and the vertical co-ordinate of the grid center pixel corresponding to each grid in the preset classification map; and
obtaining the co-ordinate information of the first key-point, based on the horizontal co-ordinate information of the first key-point and the vertical co-ordinate information of the first key-point.

7. The method as claimed in claim 6, wherein the obtaining the horizontal co-ordinate information of the first key-point by the second computation model, based on the grid probability and the horizontal co-ordinate of the grid center pixel corresponding to each grid in the preset classification map comprises:

computing a weighted sum of the grid probability and the horizontal co-ordinate of the grid center pixel corresponding to each grid in the preset classification map by the second computation model, and determining a computed weighted sum value as the horizontal co-ordinate information of the first key-point.

8. The method as claimed in claim 6, wherein the obtaining the vertical co-ordinate information of the first key-point by the third computation model, based on the grid probability and the vertical co-ordinate of the grid center pixel corresponding to each grid in the preset classification map comprises:

computing a weighted sum of the grid probability and the vertical co-ordinate of the grid center pixel corresponding to each grid in the preset classification map by the third computation model, and determining a computed weighted sum value as the vertical co-ordinate information of the first key-point.

9. The method as claimed in claim 1, wherein after the determining the co-ordinate information of the first key-point, the method further comprises:

scaling the co-ordinate information of the first key-point, and determining the scaled co-ordinate information as the co-ordinate information of the first key-point.

10. The method according to claim 9, wherein the co-ordinate information of the first key-point comprises the horizontal co-ordinate of the first key-point and the vertical co-ordinate of the first key-point; and the scaling the co-ordinate information of the first key-point, and determining the scaled co-ordinate information as the co-ordinate information of the first key-point comprises:

scaling the horizontal co-ordinate information of the first key-point by a first preset value, to obtain a scaled horizontal co-ordinate information of the first key-point;

scaling the vertical co-ordinate information of the first key-point by a second preset value, to obtain a scaled vertical co-ordinate information of the first key-point; and obtaining the co-ordinate information of the first key-point, based on the scaled horizontal co-ordinate information of the first key-point and the scaled vertical co-ordinate information of the first key-point.

11. The method as claimed in claim 10, further comprising:

acquiring a size parameter of a bounding box containing the target hand and a dimensional parameter of the preset classification map;

computing a first ratio of the size parameter of the bounding box and the dimensional parameter of the preset classification map along the horizontal direction, and assigning the first ratio as the first preset value; and computing a second ratio of the size parameter of the bounding box and the dimensional parameter of the preset classification map along the vertical direction, and assigning the second ratio as the second preset value.

12. An electronic device, comprising a memory and a processor; wherein the memory is configured for storing executable instructions capable of running on the processor; and the processor is configured for executing a hand pose estimation method when running the executable instructions, the hand pose estimation method comprising:

determining a classification logic map corresponding to each of a plurality of key-points, and selecting a key-point of the plurality of key-points as a first point; the plurality of key-points represent key nodes of a skeleton of a target hand;

determining, based on a preset classification map and the classification logic map corresponding to the first key-point, co-ordinate information of the first key-point; and obtaining a pose estimation result of the target hand, after determining co-ordinate information corresponding to each of the plurality of key-points;

wherein the determining, based on the preset classification map and the classification logic map corresponding to the first key-point, the co-ordinate information of the first key-point comprises:

determining, based on the classification logic map corresponding to the first key-point, triplet information for each grid in the preset classification map; and determining, based on the triplet information of each grid in the preset classification map, the co-ordinate information of the first key-point;

the triplet information comprises a grid probability, a horizontal co-ordinate and a vertical co-ordinate of a grid center pixel.

13. The electronic device as claimed in claim 12, wherein the determining the classification logic map corresponding to each of the plurality of key-points comprises:

acquiring a feature map corresponding to the target hand; and performing a classification process on the plurality of key-points in the feature map, and obtaining a classification logic map corresponding to each of the plurality of key-points.

14. The electronic device as claimed in claim 13, wherein the acquiring the feature map corresponding to the target hand comprises:

acquiring a depth image comprising the target hand;

performing a hand detection process on the depth image by a preset feature extractor, and obtaining an initial feature map comprising the target hand; and convolving the initial feature map by a head segmentation model, and obtaining the feature map corresponding to the target hand.

15. The electronic device as claimed in claim 12, wherein the determining, based on the classification logic map corresponding to the first key-point, the triplet information for each grid in the preset classification map comprises:

computing, based on the classification logic map corresponding to the first key-point, a grid probability corresponding to each grid by a first computation model;

acquiring the horizontal co-ordinate and the vertical co-ordinate of the grid center pixel corresponding to each grid; and composing, based on the grid probability, the horizontal co-ordinate and the vertical co-ordinate of the grid center pixel corresponding to each grid, the triplet information of each grid in the preset classification map.

16. A non-transitory computer-readable storage medium, storing a hand pose estimation program, the hand pose estimation program when being executed by a processor realizes a hand pose estimation method, comprising:

determining a classification logic map corresponding to each of a plurality of key-points, and selecting a key-point of the plurality of key-points as a first point; the plurality of key-points represent key nodes of a skeleton of a target hand;

determining, based on a preset classification map and the classification logic map corresponding to the first key-point, co-ordinate information of the first key-point; and obtaining a pose estimation result of the target hand, after determining co-ordinate information corresponding to each of the plurality of key-points;

wherein the determining, based on the preset classification map and the classification logic map corresponding to the first key-point, the co-ordinate information of the first key-point comprises:

determining, based on the classification logic map corresponding to the first key-point, triplet information for each grid in the preset classification map; and determining, based on the triplet information of each grid in the preset classification map, the co-ordinate information of the first key-point;

the triplet information comprises a grid probability, a horizontal co-ordinate and a vertical co-ordinate of a grid center pixel.

* * * * *